(12) United States Patent
Olsson et al.

(10) Patent No.: US 12,371,248 B2
(45) Date of Patent: Jul. 29, 2025

(54) LAMINATED PACKAGING MATERIAL FOR LIQUID FOOD PRODUCTS, A METHOD FOR MAKING THE SAME, A METHOD FOR PRINTING ON THE SAME AND A PACKAGE MADE FROM THE SAME

(71) Applicant: TETRA LAVAL HOLDINGS & FINANCE S.A., Pully (CH)

(72) Inventors: Sverker Olsson, Södra Sandby (SE); Anders Glemming, Hjärup (SE); Martin Bäckman, Malmö (SE); Christer Karlsson, Bjärred (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 980 days.

(21) Appl. No.: 17/271,851

(22) PCT Filed: Aug. 23, 2019

(86) PCT No.: PCT/EP2019/072555
§ 371 (c)(1),
(2) Date: Feb. 26, 2021

(87) PCT Pub. No.: WO2020/043609
PCT Pub. Date: Mar. 5, 2020

(65) Prior Publication Data
US 2021/0245949 A1    Aug. 12, 2021

(30) Foreign Application Priority Data
Aug. 28, 2018 (EP) .................................. 18191330

(51) Int. Cl.
*B65D 85/72*     (2006.01)
*B32B 27/10*     (2006.01)
(Continued)

(52) U.S. Cl.
CPC .............. *B65D 85/72* (2013.01); *B32B 27/10* (2013.01); *B32B 27/32* (2013.01); *B32B 33/00* (2013.01);
(Continued)

(58) Field of Classification Search
None
See application file for complete search history.

(56) References Cited

U.S. PATENT DOCUMENTS

2005/0067127 A1* 3/2005 Frisk ...................... B32B 27/20
                                                                    428/323
2005/0252627 A1* 11/2005 Kikuchi .................. B65D 5/62
                                                                    162/134
(Continued)

FOREIGN PATENT DOCUMENTS

EP      0933407 A1     8/1999
JP      2003-025548 A  1/2003
(Continued)

OTHER PUBLICATIONS

Office Action (Notice of Reasons for Refusal) issued Oct. 31, 2022, by the Japan Patent Office in corresponding Japanese Patent Application No. 2021-510649 and an English Translation of the Office Action. (12 pages).
(Continued)

*Primary Examiner* — Michael C Romanowski
*Assistant Examiner* — Thomas J Kessler
(74) *Attorney, Agent, or Firm* — Buchanan Ingersoll & Rooney PC

(57) ABSTRACT

A laminated packaging material for liquid food products comprising, a core layer of paper or paperboard or other cellulose-based material, a laminate portion being arranged on a first side of the core layer, a dark colored flexographic ink composition printed onto the free surface of the laminate
(Continued)

portion, the dark colored ink composition comprises color bases mixed at a ratio such that a total energy absorption by the dark colored flexographic ink composition, when provided on the laminated packaging material, is below 80%, such as below 70% in an emission spectra from a tungsten light source in the region 250-2500 nm at a temperature of 3000 K, the dark colored flexographic ink composition has a color space lightness value $L^* \leq 25$, and a color space difference equal to or lower than 6, with respect to a specified black reference composition.

18 Claims, 8 Drawing Sheets

(51) Int. Cl.
```
B32B 27/32      (2006.01)
B32B 33/00      (2006.01)
B32B 38/00      (2006.01)
B41M 1/04       (2006.01)
B41M 1/36       (2006.01)
B41M 5/00       (2006.01)
C09D 11/037     (2014.01)
C09D 11/30      (2014.01)
```
(52) U.S. Cl.
CPC ............ *B32B 38/145* (2013.01); *B41M 1/04* (2013.01); *B41M 1/36* (2013.01); *B41M 5/0047* (2013.01); *C09D 11/037* (2013.01); *C09D 11/30* (2013.01); *B32B 2250/03* (2013.01); *B32B 2250/40* (2013.01); *B32B 2255/12* (2013.01); *B32B 2307/4023* (2013.01); *B32B 2307/7265* (2013.01); *B32B 2307/75* (2013.01); *B32B 2317/12* (2013.01); *B32B 2323/046* (2013.01); *B32B 2439/62* (2013.01); *B32B 2439/70* (2013.01); *B65D 2207/00* (2013.01)

(56) References Cited

U.S. PATENT DOCUMENTS

| | | | |
|---|---|---|---|
| 2007/0218276 A1* | 9/2007 | Hiramatsu | G02F 1/133308 428/354 |
| 2010/0186891 A1* | 7/2010 | Ruch | C09D 5/035 428/323 |
| 2010/0279041 A1 | 11/2010 | Mathew et al. | |
| 2013/0027478 A1* | 1/2013 | Kozee | C09D 11/36 347/73 |
| 2014/0099267 A1* | 4/2014 | Jarvis | B41M 5/5218 106/31.32 |
| 2016/0075162 A1 | 3/2016 | Lefebvre et al. | |
| 2017/0087810 A1* | 3/2017 | Schuman | C09D 129/04 |
| 2017/0151765 A1* | 6/2017 | Öhman | B65D 5/067 |
| 2019/0047299 A1 | 2/2019 | Matsumoto et al. | |
| 2019/0184726 A1* | 6/2019 | Lamproye | B41M 5/0023 |
| 2019/0291631 A1 | 9/2019 | Bettella | |
| 2020/0123401 A1 | 4/2020 | Ii et al. | |

FOREIGN PATENT DOCUMENTS

| | | | | |
|---|---|---|---|---|
| JP | 2006-167984 A | 6/2006 | | |
| JP | 2008-230233 A | 10/2008 | | |
| JP | 2016-123939 A | 7/2016 | | |
| JP | 2016-525954 A | 9/2016 | | |
| JP | 2017-515754 A | 6/2017 | | |
| JP | 2017-521287 A | 8/2017 | | |
| JP | 2019-014116 A | 1/2019 | | |
| WO | 2009023520 A1 | 2/2009 | | |
| WO | WO-2012084452 A1 * | 6/2012 | | B41F 5/24 |
| WO | 2015140974 A1 | 9/2015 | | |
| WO | 2016008744 A1 | 1/2016 | | |
| WO | 2017/138438 A1 | 8/2017 | | |
| WO | 2017207468 A1 | 12/2017 | | |

OTHER PUBLICATIONS

International Search Report (PCT/ISA/210) issued on Dec. 19, 2019, by the European Patent Office as the International Searching Authority for International Application No. PCT/EP2019/072555.
Written Opinion (PCT/ISA/237) issued on Dec. 19, 2019, by the European Patent Office as the International Searching Authority for International Application No. PCT/EP2019/072555.

* cited by examiner

LAMINATED PACKAGING MATERIAL FOR LIQUID FOOD PRODUCTS, A METHOD FOR MAKING THE SAME, A METHOD FOR PRINTING ON THE SAME AND A PACKAGE MADE FROM THE SAME

TECHNICAL FIELD

The invention relates to a laminated packaging material, more specifically a laminated packaging material comprising an ink composition, such as a dark colored ink composition.

BACKGROUND ART

Today various techniques to print graphics such as a decorative pattern and/or text on a laminated packaging material for liquid food products are used. Many of them involve different methods of rotary press application of ink onto a moving web of the packaging material, to print static content and wherein the content to be printed is pressed by a roller cliché onto the laminated material and then dried or cured to remove any water or solvent. A typical such printing technique is flexographic printing, using water based ink compositions. Thus, if a large surface area of the laminated packaging material is to be printed a large investment is needed to manufacture and control a large printing station/press that covers all of the laminated material to be printed. Further, if the laminated material is to be produced with a high throughput there are further demands on the equipment, such as the positioning at high web speeds of the printed graphics of different colors relative each other, and relative other features on the material web, such as crease lines. Economic web speeds require quick drying/curing of such inks, to avoid smearing or smudging of ink, when forwarding of the printed surface to a next line operation, or to be wound up onto a reel of packaging material. Another aspect with rotary pressing techniques is that they require personnel to prepare different prints for different products or customers content and changing between the different prints takes a long time. The easiest way to understand if something is printed by flexography is to observe the raster and the minimum dot.

Alternative, or additional, printing solutions are looked at to counter some of these problems such as to enable printing dynamic content, e.g. printing with inkjet or similar digital techniques. Since the printing technology is completely different, other types of ink are needed to make the printing work. In ink-jet printing, small droplets of ink are formed and dropped onto the surface to be printed. Such inks must contain a lot of water in order to be printed, compared to the ink for the rotary pressing techniques. Ink-jet printed areas are detectable by observing the print resolution, and also dots are not perfectly aligned at high-speed printing.

Thus, if combining printing static graphics with a pressing technique and digital printing for printing dynamic content, there could be problems with the laminated packaging material when drying the inks since they have different water content in the inks used for the different techniques. The typical print appearance of flexo and inkjet printed areas are known to the skilled artisan.

SUMMARY

It is an object of the invention to at least partly overcome one or more of the above-identified limitations of the prior art. In particular, it is an object to provide an ink composition, such as a dark colored ink composition, for a packaging laminate which reduces the risk of defects in the laminate during the curing of the ink in the printing process.

The laminate portion is arranged on a first side of a core layer of paper or paperboard or other cellulose-based material. The laminate portion comprises at least one layer of a polymer, such as a thermoplastic polymer, such as a polyolefin-based polymer. The polyolefin-based polymer layer may be an extrusion coated or extrusion laminated layer, or a separately made, pre-manufactured, polyolefin-based film, which may be orientated in at least one direction. The polyolefin-based polymer may be selected from the group consisting of polyethylene, polypropylene, blends thereof and copolymers comprising in the majority ethylene and/or propylene. The laminate portion may alternatively comprise a pre-manufactured polymer film comprising PET (polyethylene terephthalate) or other thermoplastic polyester. The laminate portion may further comprise layers of adhesives or adhesive polymers. The pre-manufactured film may further comprise further coatings, such as barrier coatings, such as metalized coatings or holographic patterns.

The laminate portion may thus be printed with various printing techniques to obtain a graphic pattern with static and/or dynamic content. The printed graphics is applied onto the outside, free surface of the laminate portion, when laminated and attached to the core layer.

The ink composition comprising the pigments, i.e. the color base, for providing the colored pattern, such as a dark colored pattern, may further comprise a binder, such as a polymeric or oligomeric binder, solvents, such as water, and further additives and resins. It should be understood that the amounts of these binders, solvents, additives, resins etc., may vary while the advantageous ratios and amounts of the color base, i.e. the CMYK or GVCMYK color bases, as described in the present disclosure provides for the related advantages as described. The color bases may comprise color pigments, such as CMYK or GVCMYK color pigments as described in the present disclosure. It is conceivable however that the color base may alternatively, or in addition, comprise other color compounds such as dye ink color.

Percentages in the present disclosure are given as weight percentages unless otherwise indicated.

The laminate portion comprises at least one polymer layer that may be sensitive to high heat loads, such as during drying. Typical heat sensitive polymer layers are polyolefins, such as polyethylenes, polypropylenes, blends and copolymers thereof. Typically, the laminate portion may comprise a film of an orientated polymer, e.g. a pre-manufactured film as mentioned above, which has been coated with an attractive coating for an improved external appearance of packages made from the laminated material. Examples of such films are metalized mono- or biaxially orientated polypropylene films (OPP, BOPP), or holographic polymer films based on orientated polyolefins, such as OPP or BOPP. Such a film may alternatively be an orientated high density polyethylene film (OHDPE, BOHDPE). Also polyester films are possible for such metalized or holographic films, such as orientated polyethylene terephthalate (OPET, BOPET).

On the surface of the thus printed laminate portion, i.e. the surface directed to the outside of a package made from the laminated packaging material, there may be provided a further liquid tight polymer, making the material suitable for liquid food packaging. Such a liquid-tight polymer forms the outside surface of the package and may be a thermoplastic polymer layer further rendering also the outside of the package heat sealable.

The core layer may be a paper or paperboard or other cellulose-based material, which provides bulk and stabilizing properties to the laminated material. A bulky and interior layer of this kind, may provide bending stiffness and dimensional stability by its own contribution. Alternatively, it may contribute to the total bending stiffness and flexural rigidity of the laminate by being combined in a sandwich construction with facing layers on one or both sides, the facing layers having a higher Young's modulus than the bulky core layer itself. The core layer is able to provide, by its cellulose content, some isolating barrier to heat, such that polymers directly adjacent to it can better resist high temperatures.

On the second side, i.e. the inside of the core layer, there may be applied further laminate portions including further polymer layers, barrier layers or coatings, paper sheets, foils etc.

The laminate packaging material for packaging of liquid food products comprises at least on innermost liquid tight and heat sealable polymer layer of a thermoplastic material, such as a polyolefin. Suitable polyolefins for such innermost layers are polyethylenes or polypropylenes, or copolymers thereof. Particularly suitable are lower density polyethylenes such as low density polyethylene (LDPE), linear low density polyethylenes (e.g. including one or more of so-called Linear Low Density Polyethylene (LLDPE), metallocene-LLDPE (mLLDPE), Ultra-low Density Polyethylene (ULDPE), and Very Low Density Polyethylene (VLDPE)) and blends thereof. Between the core layer and the innermost layer, there may be further material layers, providing oxygen barrier and other barrier properties, such as an aluminium foil, layers from polymers having gas barrier properties, barrier coated films, such as metallised films, vapour deposition coated films or the like. Common and suitable gas barrier polymers are for example polyamides or polymers of ethylene and vinyl alcohol (EVOH). Further barrier or stabilizing layers may be added between the core layer and the innermost layer, such as further paper sheets or the like.

According to a first aspect a laminated packaging material for liquid food products is provided comprising, a core layer of paper or paperboard or other cellulose-based material having a first and a second side, the second side is on the opposite side from the first side of the core layer of the paper or paperboard or other cellulose-based material, a laminate portion being arranged on the first side of the core layer of paper or paperboard or other cellulose-based material, a dark colored flexographic ink composition printed onto the free surface of the laminate portion, and at least partly covering the free surface, the dark colored flexographic ink composition comprises color bases mixed at a ratio such that a total energy absorption by the dark colored flexographic ink composition, when provided on the laminated packaging material, is below 80%, such as below 70% of the radiance energy in an emission spectra from a tungsten light source in the region 250-2500 nm at a temperature of 3000 K of the tungsten light source, wherein the dark colored flexographic ink composition has a color space lightness value $L^* \leq 25$, and wherein the dark colored flexographic ink composition has a color space difference ($\Delta E2000$) equal to or lower than 6, with respect to a black reference composition, wherein the black reference composition has in the color space; a lightness value $L^*=17$, a red-green color component $a^*=0$, and a blue-yellow color component $b^*=0$.

According to a second aspect a system for producing a laminated packaging material for liquid food products is provided comprising, a drying unit for drying the packaging material having a first and a second side, the second side is on the opposite side from the first side of a core layer of paper or paperboard or other cellulose-based material, and having a laminate portion arranged on the first side of the a core layer of paper or paperboard or other cellulose-based material, a printing unit for printing a dark colored flexographic ink composition on the free surface of the laminate portion, and at least partly covering the free surface, wherein the dark colored flexographic ink composition comprises color bases mixed at a ratio such that a total energy absorption by the dark colored flexographic ink composition, when printed on the laminated packaging material, is below 80%, such as below 70% of the radiance energy in an emission spectra from a tungsten light source in the region 250-2500 nm at a temperature of 3000 K of the tungsten light source, wherein the dark colored flexographic ink composition has a color space lightness value $L^* \leq 25$, and wherein the dark colored flexographic ink composition has a color space difference ($\Delta E2000$) equal to or lower than 6, with respect to a black reference composition, wherein the black reference composition has in the color space; a lightness value $L^*=17$, a red-green color component $a^*=0$, and a blue-yellow color component $b^*=0$. According to a third aspect a method of printing on a laminated packaging material for liquid food products is provided. The method comprising the steps of, providing a core layer of paper or paperboard or other cellulose-based material, having a first and a second side, the second side is on the opposite side from the first side of the core layer of paper or paperboard or other cellulose-based material, a laminate portion is arranged on the first side of the core layer of paper or paperboard or other cellulose-based material. The method comprises printing a dark colored flexographic ink composition on the free surface of the laminate portion to at least partly cover the free surface, wherein the dark colored flexographic ink composition comprises color bases mixed at a ratio such that a total energy absorption of the dark colored flexographic ink composition, when printed on the laminated packaging material, is below 80%, such as below 70% in an emission spectra from a tungsten light source in the region 250-2500 nm at a temperature of 3000 K of the tungsten light source, wherein the dark colored flexographic ink composition has a color space lightness value $L^* \leq 25$, wherein the dark colored flexographic ink composition has a color space difference ($\Delta E2000$) equal to or lower than 6, with respect to a black reference composition, wherein the black reference composition has in the color space; a lightness value $L^*=17$, a red-green color component $a^*=0$, and a blue-yellow color component $b^*=0$.

According to a fourth aspect a method of producing a liquid food package is provided comprising providing a packaging material for liquid food products according to the first aspect and folding the packaging material into an at least partly complete package.

According to a fifth aspect a liquid food package is provided comprising, a core layer of paper or paperboard or other cellulose-based material having a first and a second side, the second side being on the opposite side from the first side of the core layer of paper or paperboard or other cellulose-based material, a laminate portion being arranged on the first side of the core layer of paper or paperboard or other cellulose-based material, a dark colored flexographic ink composition printed onto the free surface of the laminate portion, and at least partly covering the free surface, and, wherein the dark colored flexographic ink composition comprises color bases mixed at a ratio such that a total energy absorption of the dark colored flexographic ink composition, when provided on the laminated packaging material, is below 80%, such as below 70% of the radiance energy in an emission spectra from a tungsten light source in the region 250-2500 nm at a temperature 3000 K of the tungsten light source, wherein the dark colored flexographic ink composition has a color space lightness value L*≤25, and wherein the dark colored flexographic ink composition has a color space difference (ΔE2000) equal to or lower than 6, with respect to a black reference composition, wherein the black reference composition has in the color space; a lightness value L*=17, a red-green color component a*=0, and a blue-yellow color component b*=0.

Further examples of the invention are defined in the dependent claims, wherein features for the first aspect may be implemented for the second and subsequent aspects, and vice versa.

Having a dark colored flexographic ink composition comprising color bases mixed at a ratio such that a total energy absorption is below 80%, such as below 70% and color space values as specified above provides for lowering of the temperature of the laminate during the drying process, and thereby reducing the risk of laminate defects, while still allowing printing dark colors with the ink composition on the laminate.

Throughout the disclosure the term laminate should be understood to mean a multilayer construction, which may comprise individual layers of polymers, adhesives, polymer films, paper sheets, layers and coatings having gas barrier properties or other barrier properties. The individual layers are normally adhered to each other across the full interface of each layer, such that they each fully cover the area of the laminate. Still other objectives, features, aspects and advantages of the invention will appear from the following detailed description as well as from the drawings.

BRIEF DESCRIPTION OF THE DRAWINGS

Examples of the invention will now be described, by way of example, with reference to the accompanying schematic drawings, in which.

DETAILED DESCRIPTION

Figure 1A:
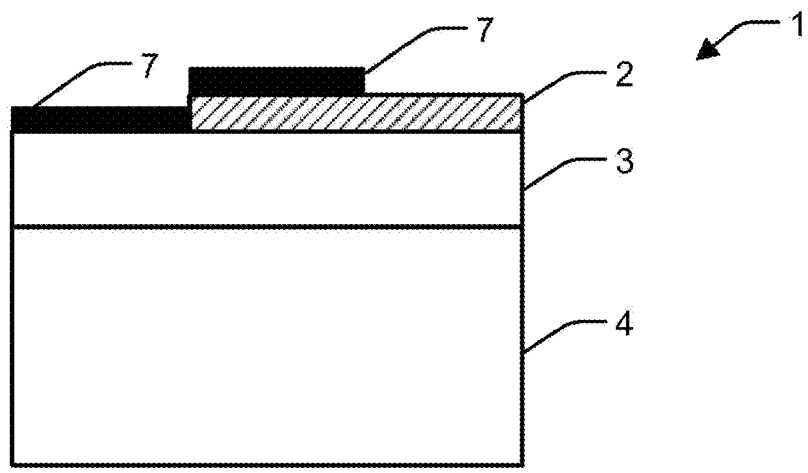
FIGS. 1a-c are cross-sectional views of a laminated packaging material for liquid food packaging comprising a printed dark colored ink composition.

With reference to FIG. 1a an example of a laminated packaging material 1 for liquid food products is illustrated. The laminated packaging material 1 comprises, a core layer 4 of paper or paperboard or other cellulose-based material having a first and a second side. The second side is on the opposite side from the first side of the core layer 4 of paper or paperboard or other cellulose-based material and constituting the inner side of the laminated packaging material 1, directed towards the inside of a packaging container 10 made from the laminated material 1. The laminated packaging material 1 further comprises a laminate portion 3 arranged on the first side of the core layer 4, which is directed to the outer side of the package 10 made from the laminated packaging material 1. A dark colored ink composition 2 is printed onto the free surface of the laminate portion 3. The dark colored ink composition 2 thus covers the free surface at least partly with a printed pattern. The dark colored ink composition 2 is a flexographic ink composition, i.e. an ink composition printed by flexography printing.

Figure 1B:
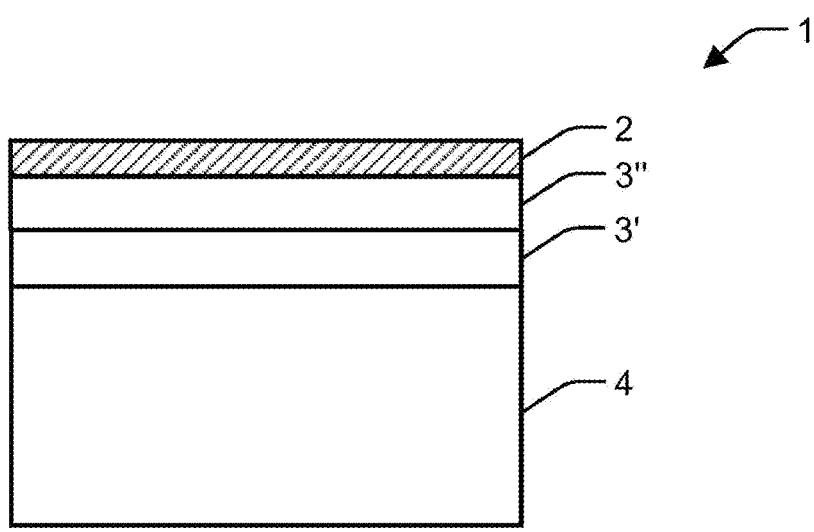
Figure 1C:
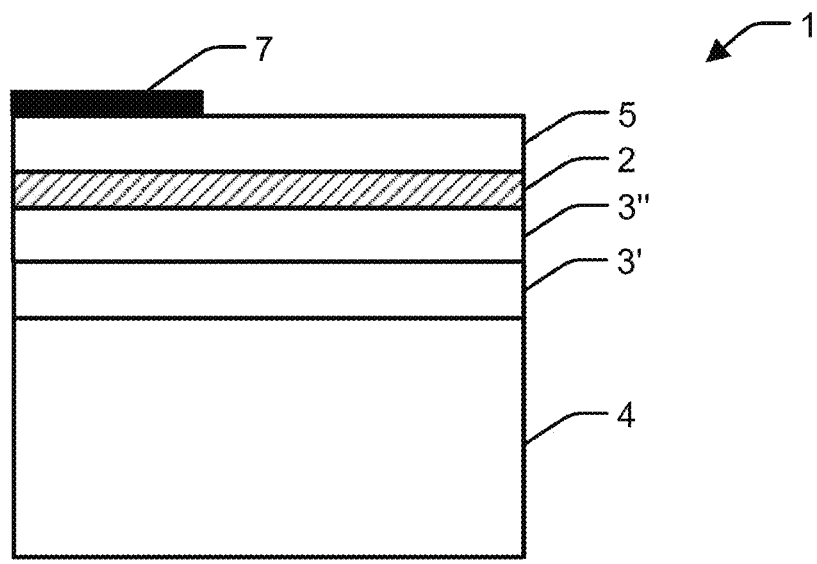
Figure 10:
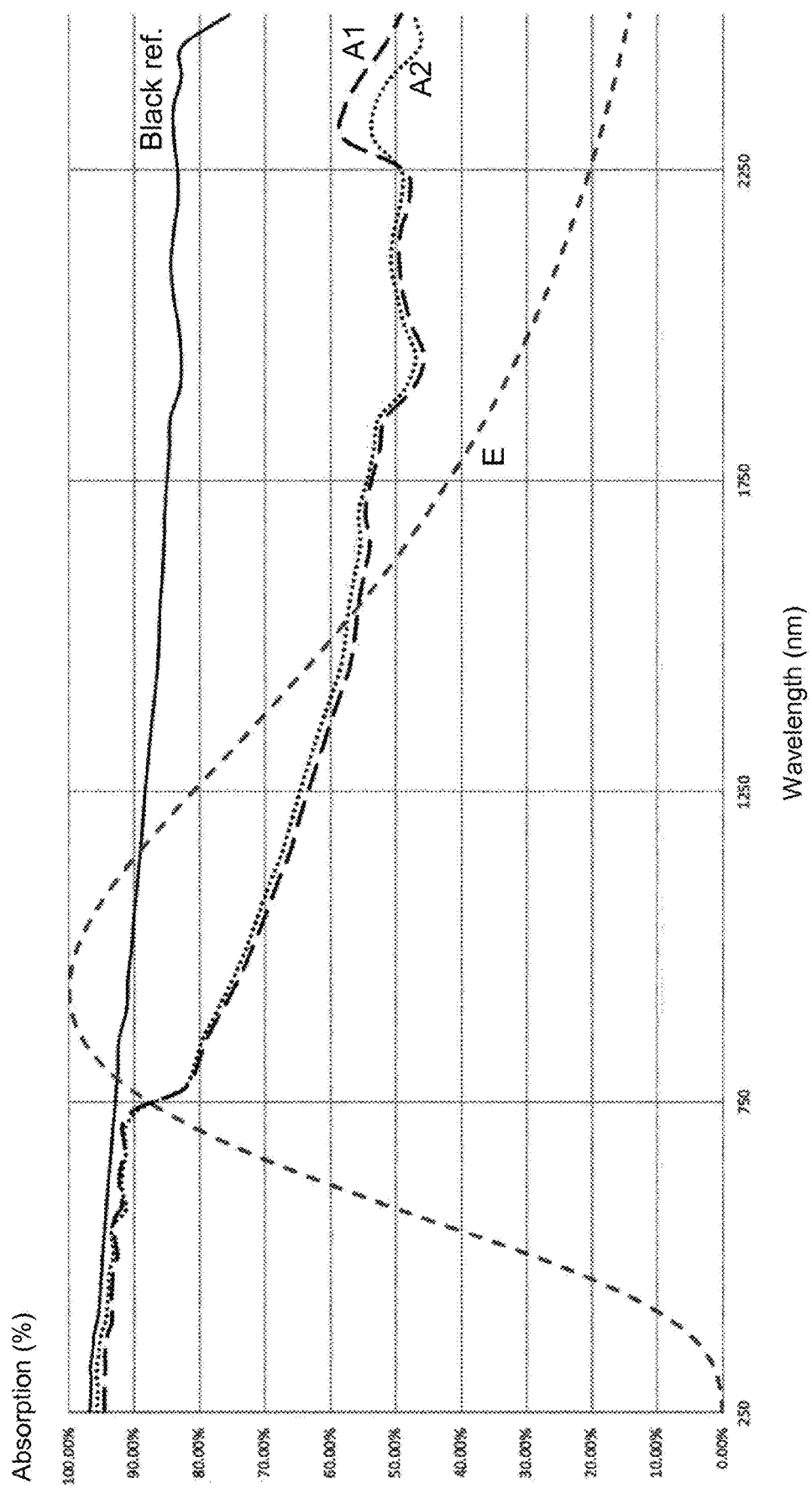
FIG. 10 is a diagram showing an emission spectra (E) from the tungsten light source and the corresponding absorption of a dark colored ink composition.

The dark colored ink composition 2 comprises color bases mixed at a ratio such that a total energy absorption by the dark colored flexographic ink composition, when provided on the laminated packaging material 1, is below 80%, such as below 70% of the radiance energy in an emission spectra from a tungsten light source in the region 250-2500 nm at a temperature of 3000 K of the tungsten light source. The absorption or absorptance can be described as the effectiveness of a surface material in absorbing radiance energy, here in the spectra 250 nm-2500 nm. FIG. 10 is a diagram showing the emission spectra (E) from the tungsten light source. The corresponding absorption (%) by the dark colored flexographic ink composition 2 when printed on the laminated packaging material 1 is shown as example curves A1 and A2. The A1 curve is obtained from samples of the laminated packaging material 1 with a transparent coating or layer comprising a thermoplastic polymer on the dark colored flexographic ink composition 2, e.g. as schematically illustrated in FIG. 1c. The A2 curve is obtained from samples of the laminated packaging material 1 without a transparent coating or layer comprising a thermoplastic polymer on the dark colored flexographic ink composition 2, e.g. as schematically illustrated in FIG. 1a. The results for the two types of packaging materials 1 are comparable. The total absorption by the dark colored flexographic ink composition 2 of the radiance energy across the range 250 nm-2500 nm is below 80%, such as below 70% for both A1 and A2, and essentially equally much below 80%, such as below 70%.

The absorption of a black body is 100% of the radiance energy. A black reference ink comprising 80% of the conventional black color base (K), is shown in FIG. 10 to absorb on average about 89% within the same spectra.

The color bases in the dark colored ink composition 2 are thus mixed at a ratio such that a total energy absorption of the dark colored flexographic ink composition 2 is below 80%, such as below 70% as specified above.

The laminated packaging material 1 may comprise one or more dark colored flexographic ink compositions 2 on the free surface of the laminate portion 3. The color bases in each of the one or more dark colored flexographic ink compositions 2 are mixed at a ratio such that a total energy absorption of the dark colored flexographic ink composition 2 is below 80%, such as below 70% as specified above. Thus, all flexographic ink compositions present in the laminated packaging material may have a total energy absorption below 80%, such as below 70%, in an emission spectra from a tungsten light source in the region 250-2500 nm at a temperature of 3000 K of the tungsten light source.

Experimental Setup for Absorption Measurement

Absorptance was calculated based on reflectance spectra measured using a Perkin Elmer Lambda 1050, UV-VIS-NIR-spectrophotometer equipped with an integrating sphere. Pressed Eastman Kodak BaSO4 was used as a reflectance reference. The absorptance was calculated using reflectance spectra between 250 and 2500 nm. The light detectors were located inside the sphere and protected from direct light by baffles. The geometry used was unidirectional illumination at an angle of 8°, i.e. the incident light reached the examined surface at an angle of 8° to the normal direction of the surface. The specular part of reflected light can be removed by removing a part of the sphere wall were all specularly reflected light falls upon. A wolfram spectrum was used as a weighting function in the calculations. Optical methods for absorptance were performed according to SS-EN ISO 22975-3:2015 Part 5 and references therein. The method was modified with respect to the change of the solar spectra to a wolfram lamp spectra in determination of the absorptance.

Integrated values of total and diffuse reflectance, ps (Total) and ps (Diffuse), were calculated according to equation 1 below;

$$\rho_s(\text{Total or Diffuse}) = \int S(\lambda)\rho(\lambda)d\lambda \, 2500 \text{ nm} \lambda = 250 \text{ nm} / \int S(\lambda) \, d\lambda \, 2500 \text{ nm} \lambda = 250 \text{ nm} \quad (\text{eq. 1})$$

where;
$S(\lambda)$ is the wolfram spectrum,
$p(\lambda)$ is the reflection spectrum (total or diffuse reflection),
$\lambda$ is the wavelength,
$\rho_s$(Specular) was calculated according to equation 2 below;

$$\rho_s(\text{Total}) = \rho_s(\text{Specular}) + \rho_s(\text{Diffuse}) \quad (\text{eq. 2}),$$

where $\rho_s$(Total), and $\rho_s$(Diffuse) are defined by and calculated according to eq. 1 above,
specularity is defined as ps (Specular)/Ps (Total),
absorbance is calculated as $\alpha_s = 1 - \rho_s$.

Based on acquired spectra ps (A) and equations 1 and 2, the absorptance (as) was calculated, which corresponds to the total absorption discussed above, which is less than 80%, such as less than 70% for the dark colored ink composition 2.

Figures 8A, 8B:
FIGS. 8a-d are illustrations of softening of a laminate portion, before and after energy has been applied to dark colored ink composition (FIGS. 8a-b), and to a reference composition comprising 45% black pigment (K) (FIGS. 8c-d)
Figures 8C, 8D:
Figure 9A:
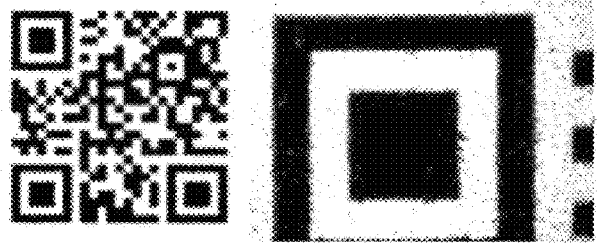
FIGS. 9a-e show examples of prints with different production speeds; 600 (a); 330 (b); 270 (c); 240 (d); 220 (e) (m/min), and associated variations in the amount of curing energy absorbed by the ink composition.
Figure 9B:
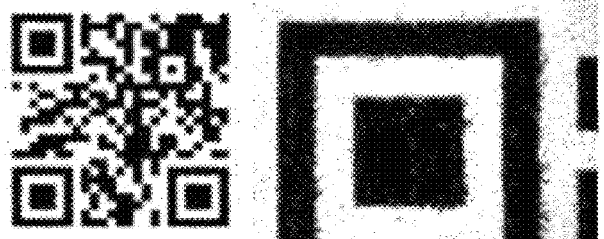
Figure 9C:
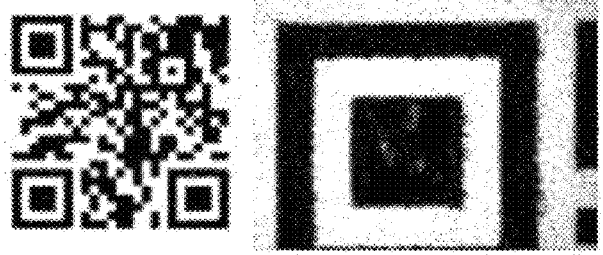
Figure 9D:
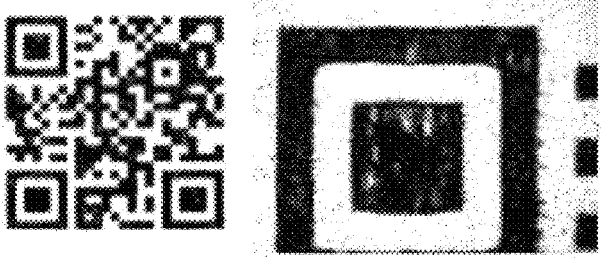
Figure 9E:
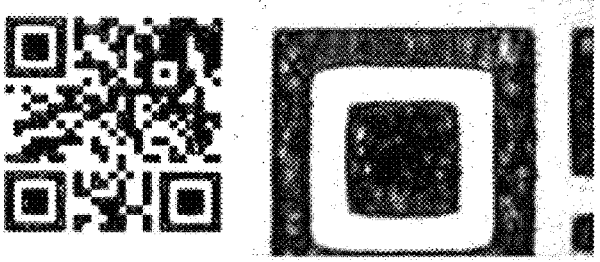

Having a dark colored flexographic ink compositions 2 comprising color bases mixed at a ratio such that a total energy absorption is below 80%, such as below 70% provides for lowering of the temperature of the laminate portion 3 under high heat load, such as during a drying process, since drying is typically accomplished by utilizing NIR dryers having an emission spectra corresponding to or overlapping with the emission spectra (E) in FIG. 10. The amount of energy absorbed by the ink composition can be correlated to the temperature attained by the ink composition 2, i.e. an increase in absorbed energy also increases the temperature. The reduced energy absorption of the ink composition 2, when being heated or passing dryers, thus lowers the maximum temperature of the ink composition 2 and thereby the laminate portion 3 due to being in thermal contact with each other. The lowered temperature reduces the risk of defects in the laminate portion 3. The total energy absorption by previous ink compositions or reference ink compositions has been shown to be above 70%, such as above 80% of the radiance energy in the above discussed emission spectra 250 nm-2500 nm and measurement method, which causes softening of the laminate portion 3 as illustrated in FIG. 8d and discussed further below.

Thus, the energy absorption by the dark colored ink composition 2 in the infrared spectrum (E) is lower than the energy required for initiating softening of the laminate portion 3. The distribution of energy is controlled so that the laminate portion 3 does not change its structure in an unwanted and irreversible way. For example, if text is printed, the text will remain in its intended shape. This is particularly advantageous when also printing patterns intended for data read-out, such as QR codes, bar codes, or other patterns intended for data read-out, which are often printed by digital, such as ink-jet, printing techniques. FIGS. 9a-e show examples of such pattern, i.e. a QR pattern, including a magnified view in the right column. Having mixed the ratio of color bases in the dark colored flexographic ink composition 2 as described above, so that the total energy absorption is below 80%, such as below 70% and softening is prevented provides for also being able to use any additional well-defined printed patterns for data read-out, corresponding to the pattern seen in FIG. 9a, in combination with exposure to high heat-load. FIGS. 9b-e on the other hand illustrate situations where softening of the laminate portion 3 has occurred with an increasing amount due to an increased amount of energy absorption, which is typically seen when using previous dark colored flexographic inks. The same applies if different graphics is printed such as logos or pictures. The reduced energy absorption is thus advantageous when exposing the printed packaging material to high heat, such as during drying by infrared irradiation, which may be necessary when combining different printing techniques. For example, when printing features with inkjet printing, the laminated packaging material 1 may need to be exposed to an increased amount of drying in the near-infrared wavelengths, which would otherwise cause softening of the laminate portion 3. It is conceivable that a static pattern (i.e. same for all packages) may be printed with the dark colored ink composition 2 in a flexographic printing process, whereas a dynamic pattern, such as a variable QR code, may be printed with ink-jet printing. The energy needed for drying the ink-jet printed pattern will thus not affect the integrity of the laminate portion 3 due to the reduced energy absorption discussed above. This also holds in case the ink-jet printed features are printed with a different ink composition, since the dark colored ink composition 2 provided by the flexographic printing lowers the energy absorption and the temperature of the laminate portion 3 sufficiently.

The energy absorption of the dark colored ink composition 2 may be;
- ≤80% in the range 805 nm-960 nm, and/or
- ≤74% in the range 960 nm-1162 nm, and/or
- ≤67% in the range 1162 nm-1422 nm, and/or
- ≤59% in the range 1422 nm-1868 nm, and/or
- ≤51% in the range 1868 nm-2263 nm.

The dark colored flexographic ink composition 2 has a color space lightness value $L^* \leq 25$. The lightness value $L^*$ is a standard measure in the "CIELAB" color space, together with the $a^*$- and $b^*$-values for the green-red and blue-yellow color components, respectively. The $L^*a^*b^*$ color space is a three-dimensional real number space. The lightness value $L^*$ represents the darkest black at $L^*=0$, and the brightest white at $L^*=100$. The color channels, $a^*$ and $b^*$, represent true neutral gray values at $a^*=0$ and $b^*=0$. The $a^*$ axis represents the green-red component, with green in the negative direction and red in the positive direction. The $b^*$ axis represents the blue-yellow component, with blue in the negative direction and yellow in the positive direction. Thus, the dark colored flexographic ink composition 2 comprises color bases mixed at a ratio such that $L^*$ is less or equal to 25. This provides for particularly advantageous dark contrasting patterns, while still having a total energy absorption below 80%, such as below 70%. Previous dark colored inks having $L^* \leq 25$ exhibit energy absorption that softens the laminate portion 3, as mentioned in relation to FIGS. 8d and 9a-e. A dark contrasting pattern may be particularly desired for data read-out, such as for bar codes or printed text or the like. Also, the energy absorption is minimized while still providing for desired color properties, e.g. saturation, tone, contrast etc, in different printed design of different layouts and colors. This means that the dark colored ink composition 2 may comprise color bases mixed in a range of combinations to provide different colors for different applications, while the mixture has a ratio of the color bases such that the total energy absorption of the dark colored ink composition 2 is lower than the energy required for softening the laminate portion 3 in the infrared spectra.

Further, the dark colored flexographic ink composition 2 has a color space difference ($\Delta E2000$) equal to or lower than 6, with respect to a black reference composition. The color space difference is a standard in the CILAB color space for quantifying the difference between two colors, where the "$\Delta E2000$" standard is the currently most widely used. The black reference composition is defined as having in the color space; a lightness value $L^*=17$, a red-green color component $a^*=0$, and a blue-yellow color component $b^*=0$. Thus, the dark colored flexographic ink composition 2 comprises color bases mixed at a ratio such that the color space difference ($\Delta E2000$) is ≤6, with respect to the black reference composition. As with the above discussed lightness value ($L^*$) being ≤25, such ink composition 2 provides for particularly advantageous dark contrasting patterns on the laminated packaging material 1 while still avoiding the risk of softening the laminate portion 3 thereof thanks to the reduced energy absorption by the ink composition 2.

The dark colored ink composition 2 may provide the above specified color space values, and a total energy absorption below 80%, such as below 70%, by a multitude of different mixtures of the color bases. In some examples, the amount of black color base (K) is tuned to a minimum value, while the amounts of the other color bases (e.g. GVCMYK color bases) are varied to obtain a dark colored ink composition 2 with desired color properties, e.g. saturation, tone, contrast etc. Table 1 below show different examples of compositions (1-3) of color bases in the dark colored ink composition 2, given in percentage in relation to the total composition, including varnish (TV) and extender (Ext).

TABLE 1

|   | Black | Additives | Blue | Rubine red | Warm yellow |
|---|---|---|---|---|---|
| 1 | 12% | 15% | 20% | 28% | 25% |
| 2 | 12% | 25% | 17% | 24% | 22% |
| 3 | 12% | 34% | 15% | 21% | 18% |

The compositions in Table 1 have the following color space values; (1) $L^*=20.9$, $a^*=0.4$, $b^*=0.2$; (2) $L^*=22.2$, $a^*=0.5$, $b^*=0.3$; (3) $L^*=22.8$, $a^*=0.3$, $b^*=0.4$.

The total energy absorption is below 80%, such as below 70% of the radiance energy in the emission spectra (E) for each composition in Table 1.

These ratio's may provide for a particularly advantageous dark flexographic ink composition 2 with optimized color properties and a further improved resistance to temperature increase due to absorption of IR energy. The pigments of the color bases GVCMYK may be mixed with a dispersing pigment vehicle to carry the pigment to the substrate. The pigment vehicle may comprise a varnish and an extender, as indicated in Table 1. The extender, or filler, increase the area covered by a given weight of pigment.

Although the ink composition 2 has been described as a dark colored ink composition in examples of the present disclosure, it should be understood that a variety of different dark colors may be provided by the ink composition 2, with varying amounts of the color bases. Thus, a wide range of dark colors can be attained with the ink composition 2 while adapting an advantageous ratio of e.g. the black color base (K) to keep the energy absorption and the associated temperature increase below the softening threshold. The type of each color base in the $L^*a^*b^*$ color space may be varied for optimization to various applications. In one example the color base may comprise the following types of pigment; Green 7, Violet 23, Blue 15:3 (phthalocyanine Blue PB15), Magenta 57.1 (lithol rubine PR), Yellow 74, Black 7. The pigments in the present disclosure are provided by Siegwerk. As mentioned, different variants may be used while still providing for the advantages associated with the color base ratio's described in the present disclosure. Pigment (K) Black-7 is a water dispersed carbon pigment which is particularly light fast.

It should be understood that the above mentioned ink composition having a ratio of color bases encompass ratio's where any of the color bases have a zero amount in the mixture. The color bases are mixed at a ratio such that the energy absorption of the dark colored ink composition is the same or lower than the energy required for softening the laminate portion in the infrared spectra.

Figure 7A:
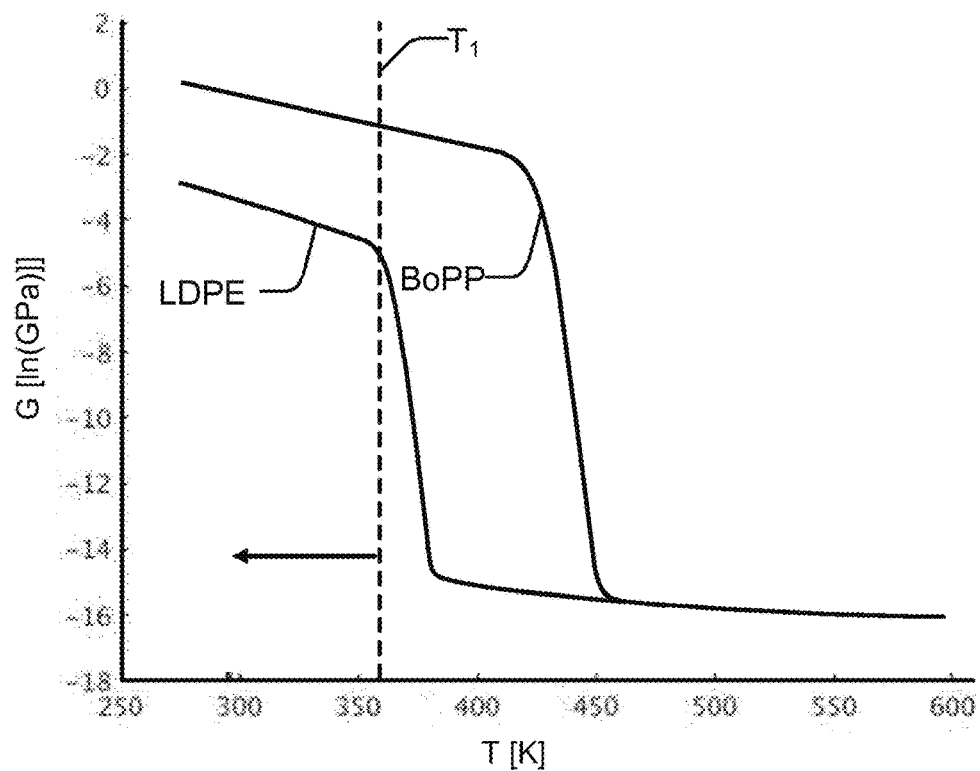
FIG. 7a is a schematic diagram showing the variation in shear modulus (G) over temperature (T) in a laminate portion.

In an example, illustrated in FIG. 7a, the softening of the laminate portion 3 occurs between 325-375 degrees Kelvin, more specifically at 360 degrees Kelvin (marked in FIG. 7a as $T_1$), when the laminate portion 3 comprises LDPE. I.e. the shear modulus (G) drops significantly at temperature $T_1$. In another example, also shown in FIG. 7a, the softening of the laminate portion 3 occurs between 420-460 degrees Kelvin, more specifically at 440 degrees Kelvin, when the laminate portion 3 comprises BoPP.

Figure 7B:
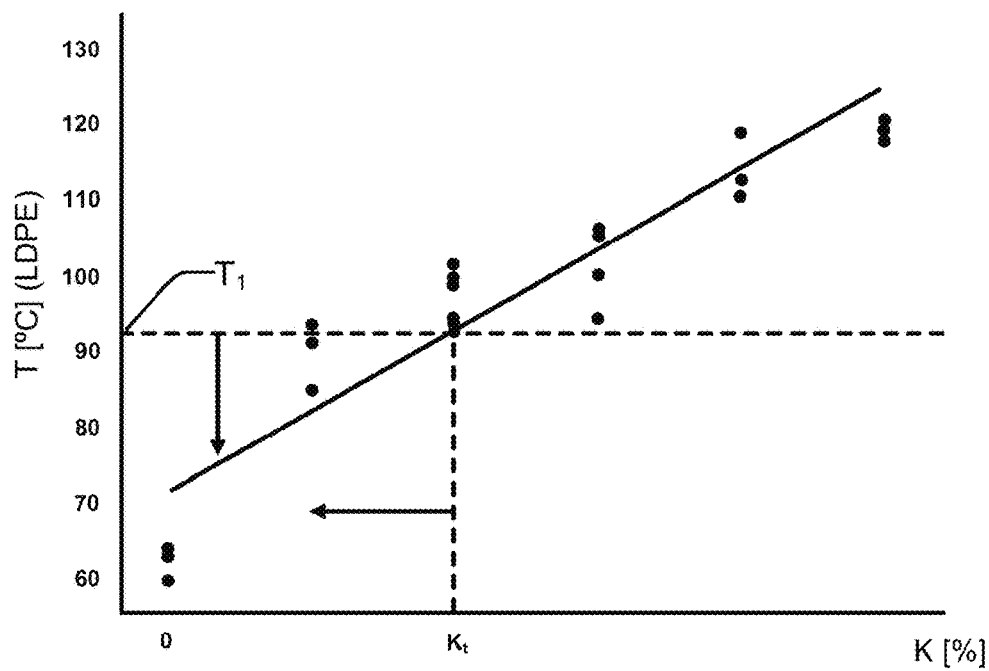
FIG. 7b is a schematic diagram showing a regression analysis of temperature values (T) in a laminate portion versus the amount of black (K) color base (%) in the ink composition.

In some examples, as illustrated in Table 1, the dark colored ink composition 2 comprises at the most 12% K, i.e. black color base, from Siegwerk. By having at the most 12% K the energy absorption of the dark ink composition 2 is controlled in such a way that a maximum temperature of the dark ink composition 2 is achieved before the laminate portion 3 reaches its softening temperature. FIG. 7b is a regression analysis of temperature values in the laminate portion 3 (LDPE) versus the amount of black (K) color base (%) in the ink composition 2. As shown, by having a threshold limit of black color base ($K_t$) such as given above at 12% K the temperature increase due to the IR absorption can be kept below $T_1$, where the shear modulus (G) drops and softening occurs. The energy required for softening the laminate portion 3 thus corresponds to the energy absorbed at $T_1$. FIG. 8 is an illustration of the visible effects of the softening of the laminate portion 3, where 47 kJ/m² has been applied to an ink composition 2 (FIGS. 8a-b) comprising 12% black color base (K), and to a reference composition comprising more than 12% black color base (K). The maximum amount of black color base depends to a large extent on the content of black pigments comprising or existing of carbon, such as so-called "Carbon Black". The content of Carbon Black may vary between different black color bases and between black color bases from different ink manufacturers. FIGS. 8a and 8c show the laminate portion 3 before energy absorption, and FIGS. 8b and 8d show the laminate portion 3 after the energy absorption. Significant softening has occurred in the laminate portion 3 for the reference composition (FIG. 8d), whereas the ink composition 2 has absorbed less energy to maintain the integrity of the laminate portion 3 (FIG. 8b).

The ratio of color bases of the ink composition 3 may be determined also partly dependent on the particle sizes of the pigments used in the color bases, such that the energy absorption of the contrasting ink composition is the same or lower than the energy required for softening the laminate portion in the infrared spectra. Hence, the ratio can be adjusted also in dependence of the pigment particle size. Thus, it should be understood that the ratio's described in the present disclosure may be varied depending on which size the pigments particles have while still providing for the advantageous properties described for the ink composition 3. Reducing the size of the pigment particles may provide for greater color saturation, color brilliance, and color gamut. It is conceivable that the amount of black (K) color base in the ink composition 3 may be reduced further while still providing for the desired color properties, such as those properties mentioned above, and at the same time further minimize the amount of absorbed energy and temperature increase during IR curing.

In another example, the maximum percentage of K that can be used is also, or alternatively based on the thickness of the laminate portion 3.

In an example, the dark colored ink composition 2 is a flexographic printing ink composition. By using dark colored flexographic ink composition 2 it is possible to print on many types of substrates, including plastic, metallic films, cellophane, and paper, such as liquid food packaging. It is also well suited for printing large areas of a solid color. In an example, the flexographic dark ink composition 2 is a water based ink.

Using a water based ink is more environmentally friendly.

In one example, the dark colored flexographic ink composition 2 has a red-green color component (a*) in the range from −4.6 to +4.6 in the color space, and a blue-yellow color component (b*) in the range from −7 to +7 in the color space. The color space difference (ΔE2000) of the dark colored flexographic ink composition 2 with respect to the black reference composition specified above may be equal to or lower than 6 in this example.

In a further example, the dark colored flexographic ink composition 2 may have a red-green color component (a*) in the range from −3.0 to +3.0 in the color space, and a blue-yellow color component (b*) in the range from −4.4 to +4.4 in the color space. This provides for particularly advantageous color properties and an ink composition 2 which can be used in a wide range of applications with different printed design of different layouts and colors.

The color space difference (ΔE2000) of the dark colored flexographic ink composition 2 with respect to the black reference composition specified above may be equal to or lower than 4. This provides for a ink composition 2 which is even darker in the color space, which is advantageous for some contrasting patterns in different printed designs.

Turning to FIG. 1a. the laminate portion 3 may comprises a thermoplastic polymer layer, comprising a polymer such as a polyolefin, such as a polyethylene, such as low density polyethylene and/or linear low density polyethylene (such as LLDPE, mLLDPE, ULDPE, VLDPE etc). Examples of other polyethylenes, that are not low density polyethylenes, are high and medium density polyethylenes (HDPE, MDPE). The dark colored ink composition 2 may be printed directly onto the thermoplastic polymer layer.

The laminate portion 3 may comprise a pre-manufactured polymer film, as described above. Turning to FIG. 1b, the laminate portion 3 may comprise a pre-manufactured polymer film 3" laminated on the first side of the core layer 4, where a second laminating layer 3' comprising a thermoplastic polymer adheres the pre-manufactured polymer film 3" to the first side of the core layer 4. The dark colored ink composition 2 may be printed onto the pre-manufactured polymer film 3".

The second laminating layer 3' and the thermoplastic polymer may comprise low-density polyethylene (LDPE) and/or linear low density polyethylene (including LLDPE, mLLDPE, ULDPE, VLDPE).

An additional layer 5 comprising a thermoplastic polymer, such as a polyolefin, or a polyethylene, such as low density polyethylene (LDPE) and/or linear low density polyethylene (including LLDPE, mLLDPE, ULDPE, VLDPE) may be provided on the dark colored ink composition 2, as schematically illustrated in FIG. 1c. The energy absorption can still be measured as described in relation to FIG. 10 above.

Figure 2:
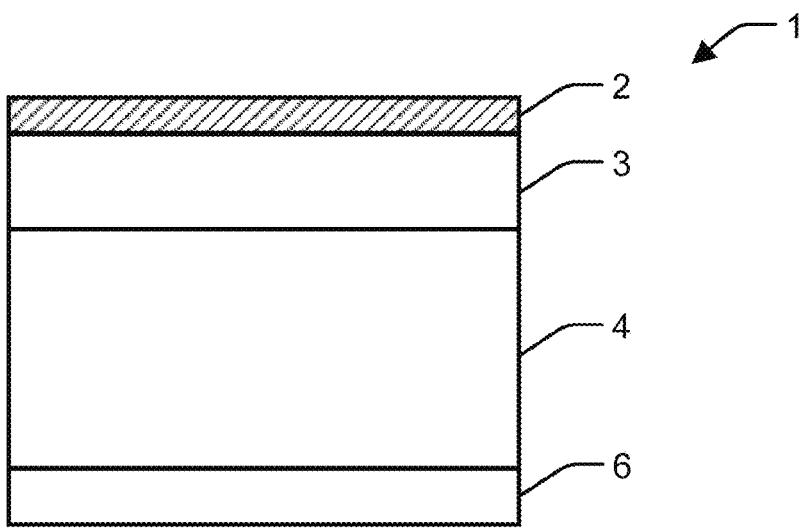
FIG. 2 is a cross-sectional view of a laminated packaging material for liquid food packaging comprising a printed dark colored ink composition and wherein the packaging material is laminated on both sides.

The second side of the core layer 4 may be laminated to an inside layer 6 of a liquid tight thermoplastic polymer, as schematically illustrated in FIG. 2. The inside layer is intended for food product contact. This provides for complementary protection of the core layer 4, such as a gas, mechanical or liquid protection.

The packaging material 1 may comprise ink-jet printed features 7, as discussed above. Ink-jet printed features 7 may be printed on the laminate portion 3, like the dark colored ink composition 2 in FIGS. 1a-b. FIG. 1a is a schematic illustration showing ink-jet printed features 7 on the laminate portion 3. The schematic illustration in FIG. 1a show also an example when the ink-jet printed features 7 overlays the dark colored ink composition 2. Alternatively, or in addition, the ink-jet printed features 7 are printed on the additional layer 5 as illustrated in the example of FIG. 1c.

In addition to the dark colored ink composition 2, which is described as a dark colored flexographic ink composition 2 in examples of the disclosure, it should be understood that further printed features, graphics or patterns may be printed by a further dark ink composition in some examples may be printed by a digital printing technology, such as by ink-jet printing. Flexographic printing can be distinguished from ink-jet printing by observing the raster and the minimum dot size of the printed features. E.g. it is possible to identify ink-jet printing by observing the print resolution and that dots are not perfectly aligned when printed in high speed. Also full area coverage will look vastly different between the printing methods. The difference in print appearance between flexographic printing and inkjet printing should be clear to the skilled person, and may be distinguished from each other and determined by the eyes of the skilled person.

In an example, the laminate portion 3 comprises a metalized film or a holographic film. By using different types of such decorated, coloured or treated film in the laminate portion 4 it is possible to provide a variety of different effects, patterns together with the dark ink composition.

Figure 3:
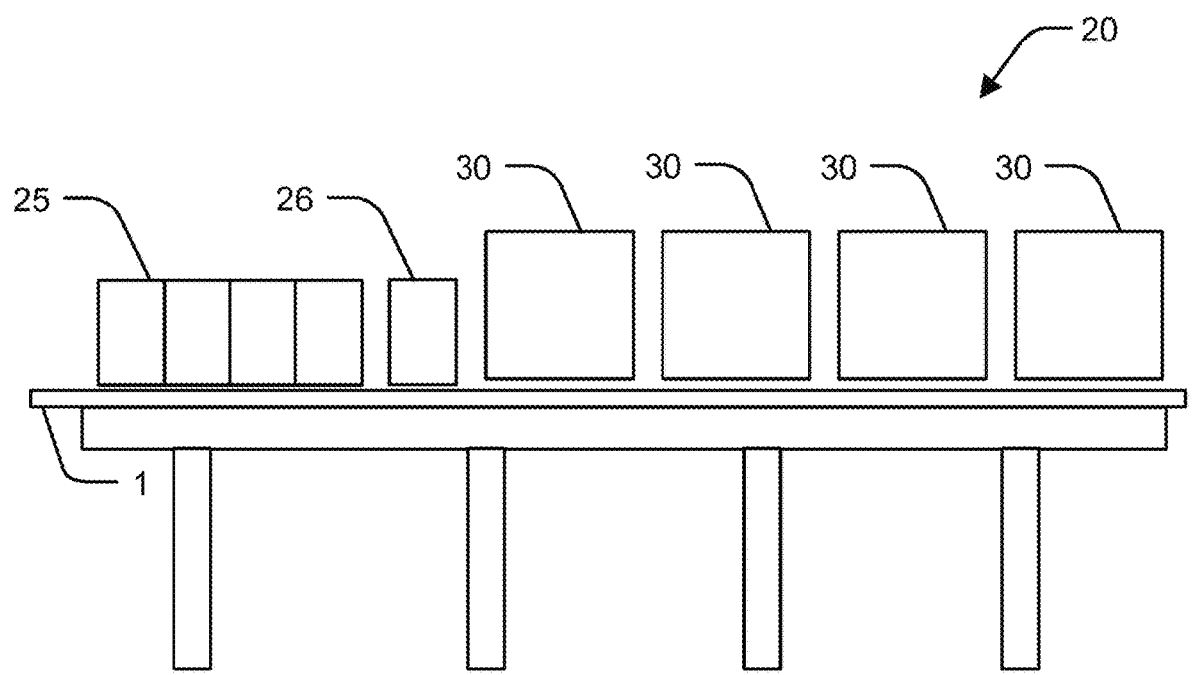
FIG. 3 is a cross-sectional view of a system for producing a laminated packaging material for liquid food packaging comprising a dark colored ink composition.

A system 20 for producing the laminated packaging material 1 for liquid food products is illustrated in FIG. 3. The system 20 comprises a drying unit 30 for drying the packaging material 1 having a first and a second side, the second side is on the opposite side from the first side of the core layer 4. As explained, a laminate portion 2 is arranged on the first side of the core layer 4 of paper or paperboard or other cellulose-based material 4. The system 20 comprises a printing unit 25 for printing a dark colored flexographic ink composition 2 on the free surface of the laminate portion 3, and at least partly covering the free surface. The dark colored flexographic ink composition 2 comprises color bases mixed at a ratio such that a total energy absorption by the dark colored flexographic ink composition 2, when printed on the laminated packaging material 1, is below 80%, such as below 70% of the radiance energy in an emission spectra from a tungsten light source in the region 250-2500 nm at a temperature of 3000 K of the tungsten light source. The dark colored flexographic ink composition 2 has a color space lightness value $L^*\leq 25$, and a color space difference ($\Delta E2000$) equal to or lower than 6, with respect to a black reference composition. The black reference composition has in the color space; a lightness value $L^*=17$, a red-green color component $a^*=0$, and a blue-yellow color component $b^*=0$.

The system 20 thus provides for the advantageous benefits as described above with reference to the laminated packaging material 1 and FIGS. 1, 2, 7-10.

In an example, the drying unit 30 uses a near infrared wavelength to heat or dry the packaging material 1. In an example, an energy of the near infrared wavelength is in a range from 5 to 80 KJ/m$^2$, such as from 20 to 60 KJ/m$^2$, such as from 35 to 55 kJ/m$^2$, such as from 45 to 49 KJ/m$^2$.

In an example, the near infrared wavelength is in a range of 250-2500 nm, and more specifically 800-1500 nm.

The system 20 may comprise an ink-jet printing unit 26, as schematically illustrated in FIG. 3. The ink-jet printing unit 26 may be arranged to print ink-jet printed features 7 on the laminated packaging material 1, as schematically illustrated in FIGS. 1a and 1c.

In an example, the system 20 runs at a speed of production that is at least 100 m/min, 200 m/min, 300 m/min, 400 m/min, 500 m/min or most preferably 600 m/min.

FIGS. 9a-e show examples of prints with the different speeds; 600 (a); 330 (b); 270 (c); 240 (d); 220 (e) (m/min). The amount of defects is reduced with the increasing speed, as the amount of energy absorbed is reduced.

Figure 4A:
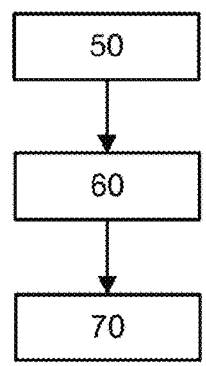
FIGS. 4a-b illustrate flow charts of a method of printing on a laminated packaging material for liquid food packaging.

FIG. 4a is a flowchart of a method 50 of printing on a laminated packaging material 1 for liquid food products comprising the steps of, providing 60 a core layer 4 of paper or paperboard or other cellulose-based material having a first and a second side, the second side is on the opposite side from the first side of the core layer 4, and having a laminate 3 arranged on the first side of the core layer 4. The method 50 comprises printing 70 a dark colored flexographic ink composition 2 on the free surface of the laminate portion 3 to at least partly cover the free surface. The dark colored flexographic ink composition 2 comprises color bases mixed at a ratio such that a total energy absorption of the dark colored flexographic ink composition 2, when having been printed on the laminated packaging material 1, is below 80%, such as below 70% of the radiance energy in an emission spectra from a tungsten light source in the region 250-2500 nm at a temperature of 3000 K of the tungsten light source. The dark colored flexographic ink composition 2 has a color space lightness value $L^*\leq 25$, and a color space difference ($\Delta E2000$) equal to or lower than 6, with respect to a black reference composition. The black reference composition has in the color space; a lightness value $L^*=17$, a red-green color component $a^*=0$, and a blue-yellow color component $b^*=0$. The method 50 thus provides for the advantageous benefits as described above with reference to the laminated packaging material 1 and FIGS. 1, 2, 7-10.

In one example, all of the color bases in the dark colored ink composition 2 are mixed at a ratio such that a total energy absorption of the dark colored flexographic ink composition 2 is below 80%, such as below 70% as specified above.

The method 50 may comprise printing 70 one or more dark colored flexographic ink compositions 2 on the free surface of the laminate portion 3. All of the color bases in each of the one or more dark colored flexographic ink compositions 2 may be mixed at a ratio such that a total energy absorption of the dark colored flexographic ink composition 2 is below 80%, such as below 70% as specified above. Thus, all flexographic ink compositions present in the laminated packaging material may have a total energy absorption below 80%, such as below 70%, of the radiance energy in an emission spectra from a tungsten light source in the region 250-2500 nm at a temperature of 3000 K of the tungsten light source.

Figure 4B:
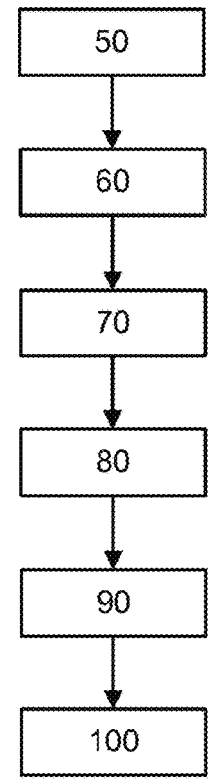
Figure 5:
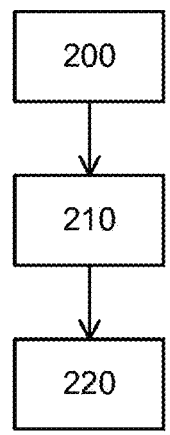
FIG. 5 illustrates a flow chart for a method of producing a package of a laminated packaging material for liquid food packaging comprising a dark colored ink composition.

FIG. 4b is a further flowchart of a method 50 of printing on a laminated packaging material for liquid food products. The method 50 may further comprise a step of printing 80 ink-jet printed features 7 on the laminate portion 3, as described above. The method 50 may comprise applying 90 an additional layer 5 of thermoplastic polymer on the dark colored flexographic ink composition 2, as schematically illustrated in FIG. 1c. The additional layer 5 of thermoplastic polymer may be applied by extrusion coating.

In an example, the method 50 may comprise applying a second laminate portion 6 including at least one further laminate layer on the second side of the core layer 4, as schematically illustrated in FIG. 2. In a further example, the method 50 may comprise a step of printing 80 ink-jet printed features 7 on the additional layer 5 of thermoplastic polymer in addition to, or instead of, the step of ink-jet printing on the laminate portion 3, as described above.

In an example, the method 50 further comprises the step of drying 100 the ink-jet printed features 7 with near infrared wavelengths. In an example, an energy of the near infrared wavelengths is in a range from 5 to 80 KJ/m$^2$, such as from 20 to 60 KJ/m$^2$, such as from 35 to 55 KJ/m$^2$, such as from 45 to 49 KJ/m$^2$.

In an example, a speed of production is at least 100 m/min, 200 m/min, 300 m/min, 400 m/min, 500 m/min or most preferably 600 m/min.

Figure 6:
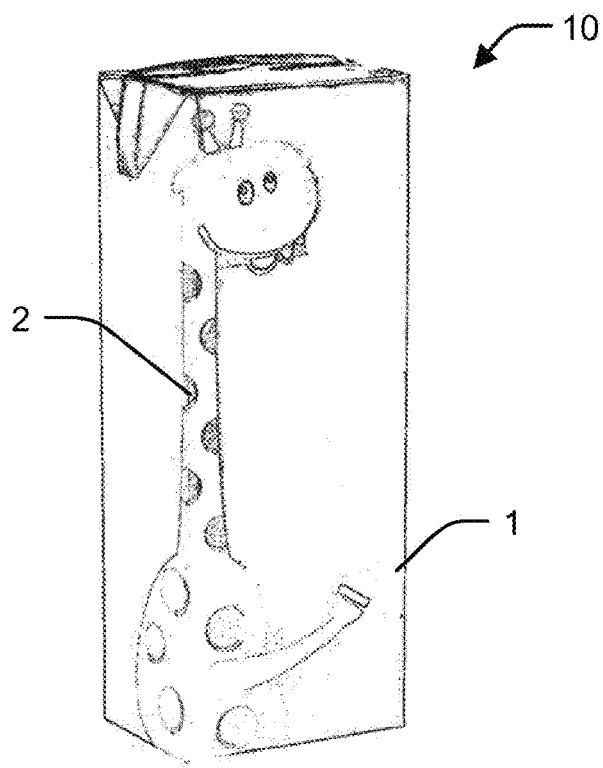
FIG. 6 is a perspective view of a package produced from a laminated packaging material for liquid food packaging comprising a dark colored ink composition.

In an example, a method 200 of producing a liquid food package 10, as schematically illustrated in FIG. 6, is provided comprising the steps of, providing 210 a packaging material 1 for liquid food products having a flexographic ink composition 2 as described above with reference to FIGS. 1, 2, 7-10, and folding 220 the packaging material 1 into an at least partly complete package 10. A partly complete package 10 is a package which is folded and sealed so it at least can hold a liquid food product. The package 10 does not need to be completely closed such that no liquid food product can leak. For example, an opening device such as a cap, or tear opening can be applied later. Or for example, the package 10 could still need that one side of the package 10 is sealed and folded to complete the package 10 into a final package 10.

A liquid food package 10 is thus also provided. The liquid food package 10 comprises a core layer 4 of paper or paperboard or other cellulose-based material having a first and a second side, the second side is on the opposite side from the first side of the core layer 4. The liquid food package 10 further comprises a laminate portion 3, the laminate portion 3 is arranged on the first side of the core layer 4. A dark colored flexographic ink composition 2 is printed onto the free surface of the laminate portion 3, and at least partly covering the free surface. The dark colored flexographic ink composition 2 comprises color bases mixed at a ratio such that a total energy absorption of the dark colored flexographic ink composition 2, when provided on the laminated packaging material 1, is below 80%, such as below 70% of the radiance energy in an emission spectra from a tungsten light source in the region 250-2500 nm at a temperature 3000 K. The dark colored flexographic ink composition 2 has a color space lightness value L*≤25, and a color space difference (ΔE2000) equal to or lower than 6, with respect to a black reference composition. The black reference composition has in the color space; a lightness value L*=17, a red-green color component a*=0, and a blue-yellow color component b*=0. The liquid food package 10 thus provides for the advantageous benefits as described above with reference to the laminated packaging material 1 and FIGS. 1, 2, 7-10.

In other examples, the liquid food package 10 has the same features and corresponding effects as described above since the liquid food package 10 is made from the laminated package material 1.

From the description above follows that, although various examples of the invention have been described and shown, the invention is not restricted thereto, but may also be embodied in other ways within the scope of the subject-matter defined in the following claims.

The invention claimed is:

1. A laminated packaging material for liquid food products comprising,
   a core layer of paper or paperboard or other cellulose-based material having a first and a second side, the second side is on the opposite side from the first side of the core layer of the paper or paperboard or other cellulose-based material,
   a laminate portion being arranged on the first side of the core layer of paper or paperboard or other cellulose-based material,
   a dark colored flexographic ink composition that is printed onto a surface of the laminate portion not in contact with the core layer and that is cured through heating to dry the dark colored flexographic ink composition so that a printed pattern exists on the surface of the laminate portion, the dark colored flexographic ink composition at least partly covering the surface not in contact with the core layer, and
   wherein the dark colored flexographic ink composition comprises color bases mixed at a ratio such that a total energy absorption by the dark colored flexographic ink composition, when provided on the laminated packaging material, is below 80% of the radiance energy in an emission spectra from a tungsten light source in the region 250-2500 nm at a temperature of 3000 K,
   wherein the dark colored flexographic ink composition has a color space lightness value L*≤25, and
   wherein the dark colored flexographic ink composition has a color space difference, ΔE2000, equal to or lower than 6, with respect to a black reference composition,
   wherein the black reference composition has in the color space;
   a lightness value L*=17,
   a red-green color component a*=0, and
   a blue-yellow color component b*=0.

2. A packaging material for liquid food products according to claim 1,
   wherein the dark colored flexographic ink composition has a red-green color component (a*) in the range from −4.6 to +4.6 in the color space, and a blue-yellow color component (b*) in the range from −7 to +7 in the color space.

3. A packaging material for liquid food products according to claim 1, wherein the color space difference is equal to or lower than 4.

4. A packaging material for liquid food products according to claim 1, wherein the dark colored flexographic ink composition has a red-green color component (a*) in the range from −3.0 to +3.0 in the color space, and a blue-yellow color component (b*) in the range from −4.4 to +4.4 in the color space.

5. A packaging material for liquid food products according to claim 1, wherein the laminate portion comprises a thermoplastic polymer layer.

6. A packaging material for liquid food products according to claim 1, wherein the laminate portion comprises a pre-manufactured polymer film.

7. A packaging material for liquid food products according to claim 1, wherein the laminate portion comprises a pre-manufactured polymer film laminated on the first side of the core layer, and wherein a second laminating layer comprising a thermoplastic polymer adheres the pre-manufactured polymer film to the first side of the core layer.

8. A packaging material for liquid food products according to claim 7, wherein the second laminating layer and the thermoplastic polymer comprises low-density polyethylene and/or linear low density polyethylene.

9. A packaging material for liquid food products according to claim 1, wherein the second side of the core layer is laminated to an inside layer of a liquid tight thermoplastic polymer, the inside layer being intended for food product contact.

10. A packaging material for liquid food products according to claim 1, comprising ink-jet printed features.

11. A packaging material for liquid food products according to claim 1, wherein the laminate portion comprises a metalized polymer film or a holographic polymer film.

12. A liquid food package comprising,
   a core layer of paper or paperboard or other cellulose-based material having a first and a second side, the second side being on the opposite side from the first side of the core layer of paper or paperboard or other cellulose-based material,
a laminate portion being arranged on the first side of the core layer of paper or paperboard or other cellulose-based material,
a dark colored flexographic ink composition that is printed onto a surface of the laminate portion not in contact with the core layer and that is cured through heating to dry the dark colored flexographic ink composition so that a printed pattern exists on the surface of the laminate portion, the dark colored flexographic ink composition at least partly covering the surface not in contact with the core layer, and, wherein the dark colored flexographic ink composition comprises color bases mixed at a ratio such that a total energy absorption of the dark colored flexographic ink composition, when provided on the laminated packaging material, is below 80% of the radiance energy in an emission spectra from a tungsten light source in the region 250-2500 nm at a temperature 3000 K,
wherein the dark colored flexographic ink composition has a color space lightness value $L^* \leq 25$, and
wherein the dark colored flexographic ink composition has a color space difference, $\Delta E2000$, equal to or lower than 6, with respect to a black reference composition,
wherein the black reference composition has in the color space;
a lightness value $L^*=17$,
a red-green color component $a^*=0$, and
a blue-yellow color component $b^*=0$.

13. A liquid food package according to claim 12, comprising ink-jet printed features.

14. A laminated packaging material for liquid food products comprising,
a core layer of paper or paperboard or other cellulose-based material having a first and a second side, the second side is on the opposite side from the first side of the core layer of the paper or paperboard or other cellulose-based material,
a laminate portion being arranged on the first side of the core layer of paper or paperboard or other cellulose-based material,
a dark colored flexographic ink composition that is printed onto a surface of the laminate portion not in contact with the core layer and that is cured through infrared irradiation to dry the dark colored flexographic ink composition so that a printed pattern exists on the surface of the laminate portion, the dark colored flexographic ink composition at least partly covering the surface not in contact with the core layer, and
wherein the dark colored flexographic ink composition comprises color bases mixed at a ratio such that a total energy absorption by the dark colored flexographic ink composition, when provided on the laminated packaging material, is below 80% of the radiance energy in an emission spectra from a tungsten light source in the region 250-2500 nm at a temperature of 3000 K,
wherein the dark colored flexographic ink composition has a color space lightness value $L^* \leq 25$, and
wherein the dark colored flexographic ink composition has a color space difference, $\Delta E2000$, equal to or lower than 6, with respect to a black reference composition,
wherein the black reference composition has in the color space;
a lightness value $L^*=17$,
a red-green color component $a^*=0$, and
a blue-yellow color component $b^*=0$.

15. A method of printing on a laminated packaging material for liquid food products comprising,
providing a core layer of paper or paperboard or other cellulose-based material having a first and a second side, the second side is on the opposite side from the first side of the core layer of paper or paperboard or other cellulose-based material, a laminate portion being arranged on the first side of the core layer of paper or paperboard or other cellulose-based material,
printing a dark colored flexographic ink composition on a surface of the laminate portion not in contact with the core layer,
curing the dark colored ink composition through heating to dry the dark colored ink composition so that a printed pattern exists on the surface of the laminate portion, the dark colored ink composition at least partly covering the surface not in contact with the core layer, wherein the dark colored flexographic ink composition comprises color bases mixed at a ratio such that a total energy absorption of the dark colored flexographic ink composition, when printed on the laminated packaging material, is below 80% of the radiance energy in an emission spectra from a tungsten light source in the region 250-2500 nm at a temperature of 3000 K,
wherein the dark colored flexographic ink composition has a color space lightness value $L^* \leq 25$,
wherein the dark colored flexographic ink composition has a color space difference, $\Delta E2000$, equal to or lower than 6, with respect to a black reference composition,
wherein the black reference composition has in the color space;
a lightness value $L^*=17$,
a red-green color component $a^*=0$, and
a blue-yellow color component $b^*=0$.

16. A method of printing on a laminated packaging material for liquid food products according to claim 15, comprising printing ink-jet printed features on the laminated packaging material.

17. A method of printing on a laminated packaging material for liquid food products according to claim 16, comprising drying the ink-jet printed features with near infrared wavelengths.

18. A method of printing on a laminated packaging material for liquid food products according to claim 15, wherein a speed of production is at least 100 m/min.

* * * * *